US012376180B2

(12) United States Patent
Roy et al.

(10) Patent No.: US 12,376,180 B2
(45) Date of Patent: *Jul. 29, 2025

(54) WIRELESS NETWORK AND METHODS TO MAINTAIN MA PDU SESSION AT NSACF

(71) Applicant: Samsung Electronics Co., Ltd., Suwon-si (KR)

(72) Inventors: Koustav Roy, Bangalore (IN); Lalith Kumar, Bangalore (IN); Arijit Sen, Bangalore (IN); Danish Ehsan Hashmi, Bangalore (IN); Ashok Kumar Nayak, Bangalore (IN); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,236

(22) Filed: Apr. 16, 2024

(65) Prior Publication Data

US 2024/0276582 A1 Aug. 15, 2024

Related U.S. Application Data

(63) Continuation of application No. 17/936,738, filed on Sep. 29, 2022, now Pat. No. 11,979,931.

(30) Foreign Application Priority Data

Sep. 30, 2021 (IN) ............................. 202141045063
Aug. 29, 2022 (IN) ............................. 202141045063

(51) Int. Cl.
*H04W 76/10* (2018.01)
*H04W 76/20* (2018.01)
*H04W 80/10* (2009.01)

(52) U.S. Cl.
CPC ............ *H04W 76/20* (2018.02); *H04W 80/10* (2013.01)

(58) Field of Classification Search
CPC ..... H04W 76/20; H04W 80/10; H04W 88/14; H04W 76/22; H04W 76/32; H04W 76/12;
(Continued)

(56) References Cited

U.S. PATENT DOCUMENTS 11,979,931 B2 * 5/2024 Roy ...................... H04W 76/20
2020/0178196 A1 6/2020 Wang et al.
(Continued)

FOREIGN PATENT DOCUMENTS

CN 113329516 A 8/2021
EP 3691380 A 8/2020
(Continued)

OTHER PUBLICATIONS

3GPP TS 23.501 V17.2.0 (Sep. 2021), Technical Specification, 3rd Generation Partnership Project; Technical Specification Group Services and System Aspects; System architecture for the 5G System (5GS); Stage 2 (Release 17), Sep. 2021, 542 pages.
(Continued)

*Primary Examiner* — Andrew Wendell

(57) ABSTRACT

The disclosure relates to a 5G or 6G communication system for supporting a higher data transmission rate. Embodiments herein disclose a wireless network and methods to maintain a MA PDU session at a NSACF entity. The method includes determining, by a SMF entity, that a PDU session is the MA PDU session based on an indication from a UE. Further, the method includes indicating, by the SMF entity, that the PDU session is the MA PDU session to the NSACF entity in response to determination. The wireless network may maintain the count accurately even though the PDU session is a MA PDU session.

18 Claims, 15 Drawing Sheets

(58) Field of Classification Search
CPC ....... H04W 76/16; H04W 4/08; H04W 76/10; H04B 17/382; H04B 3/544; H04B 7/18558
See application file for complete search history.

(56) References Cited

U.S. PATENT DOCUMENTS

| | | |
|---|---|---|
| 2021/0037585 A1 | 2/2021 | Youn et al. |
| 2021/0250409 A1 | 8/2021 | Huang-Fu |
| 2022/0030117 A1 | 1/2022 | Young et al. |
| 2022/0104075 A1 | 3/2022 | Lin et al. |
| 2022/0361093 A1 | 11/2022 | Kiss et al. |
| 2022/0361272 A1 | 11/2022 | Sugawara |
| 2022/0418012 A1 | 12/2022 | Yu |
| 2023/0006889 A1 | 1/2023 | Thyagaturu et al. |
| 2023/0102655 A1 | 3/2023 | Wang et al. |
| 2023/0113519 A1 | 4/2023 | Fernandez Alonso et al. |

FOREIGN PATENT DOCUMENTS

| | | |
|---|---|---|
| JP | 2020-205520 A | 12/2020 |
| WO | 2021119627 A1 | 6/2021 |

OTHER PUBLICATIONS

International Search Report and Written Opinion of the International Searching Authority dated Jan. 12, 2023 in connection with International Patent Application No. PCT/KR2022/014674, 7 pages.
Supplementary European Search Report dated Dec. 9, 2024, in connection with European Application No. 22876907.1, 14 pages.
3GPP TR 23.793 V16.0.0 (Dec. 2018), Technical Report, 3rd Generation Partnership Project; Technical Specification Group Services and System Aspects; Study on access traffic steering, switch and splitting support in the 5G system architecture (Release 16), Dec. 2018, 114 pages.
3GPP TS 23.501 V17.1.1 (Jun. 2021), Technical Specification, 3rd Generation Partnership Project; Technical Specification Group Services and System Aspects; System architecture for the 5G System (5GS); Stage 2 (Release 17), Jun. 2021, 526 pages.
3GPP TS 23.502 V17.1.0 (Jun. 2021), Technical Specification, 3rd Generation Partnership Project; Technical Specification Group Services and System Aspects; Procedures for the 5G System (5GS); Stage 2 (Release 17), Jun. 2021, 692 pages.
3GPP TS 29.536 V0.3.0 (Sep. 2021), Technical Specification, 3rd Generation Partnership Project; Technical Specification Group Core Network and Terminals; 5G System; Network Slice Admission Control Services Stage 3 (Release 17), Sep. 2021, 56 pages.

* cited by examiner

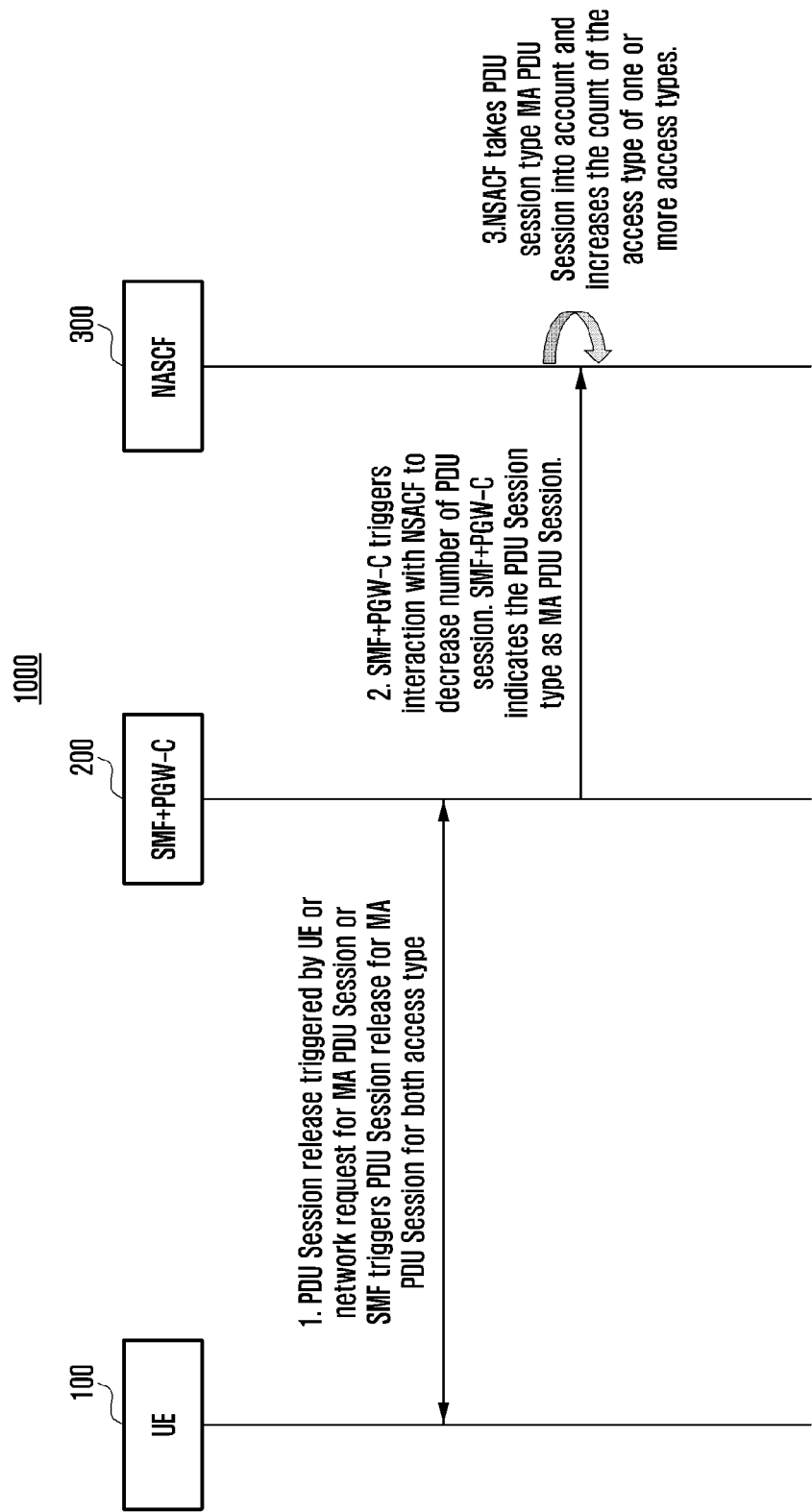

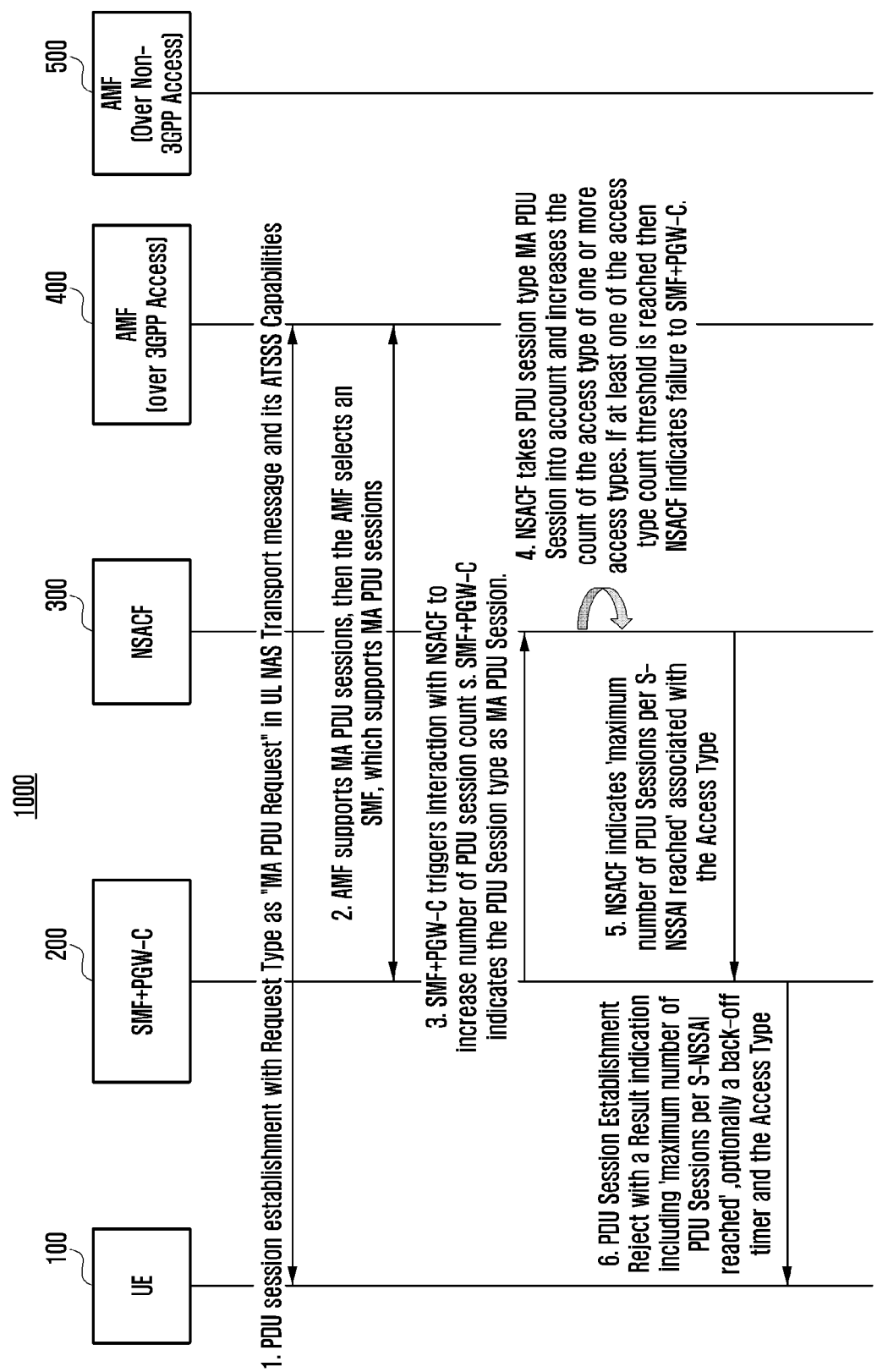

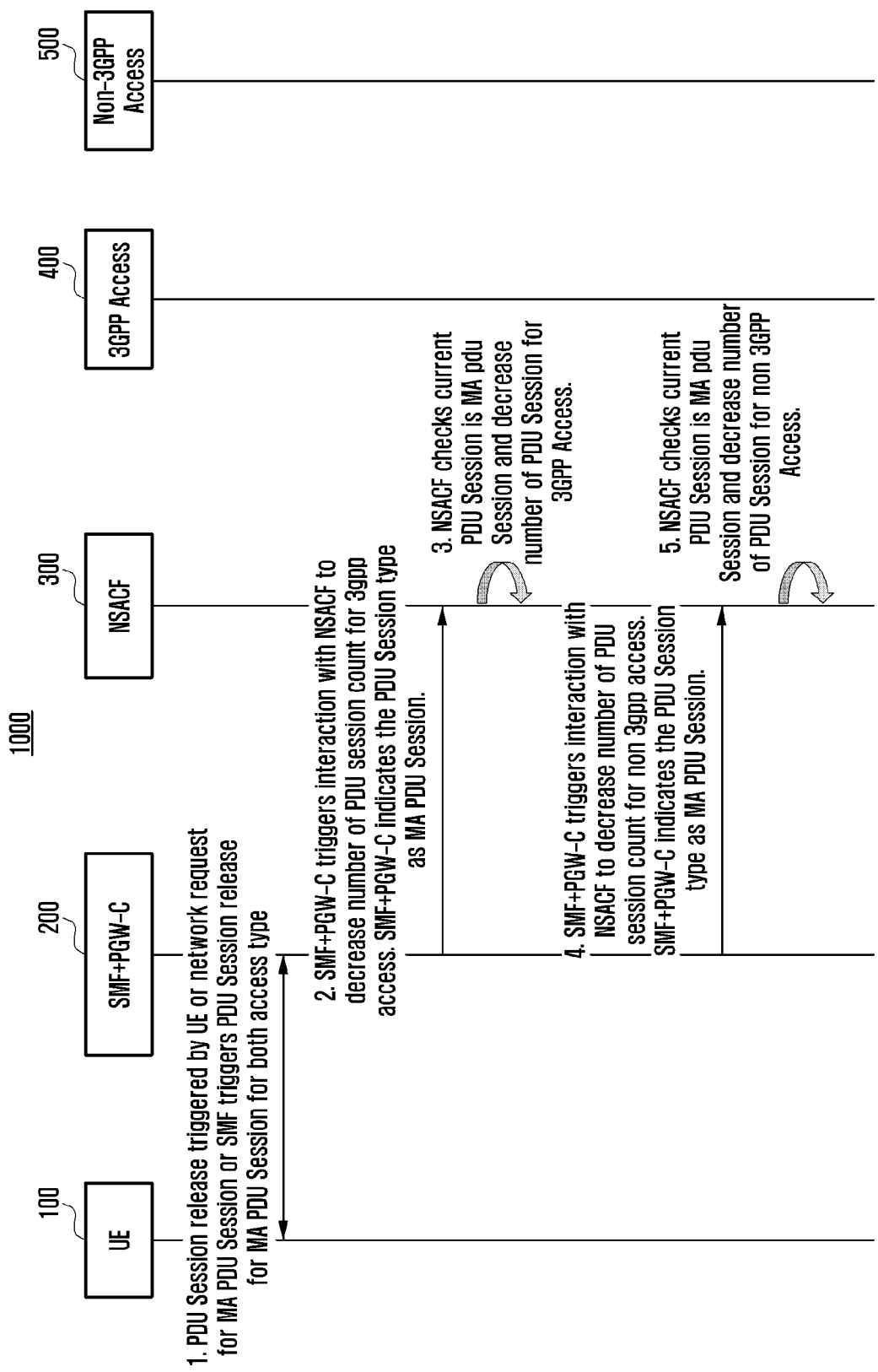

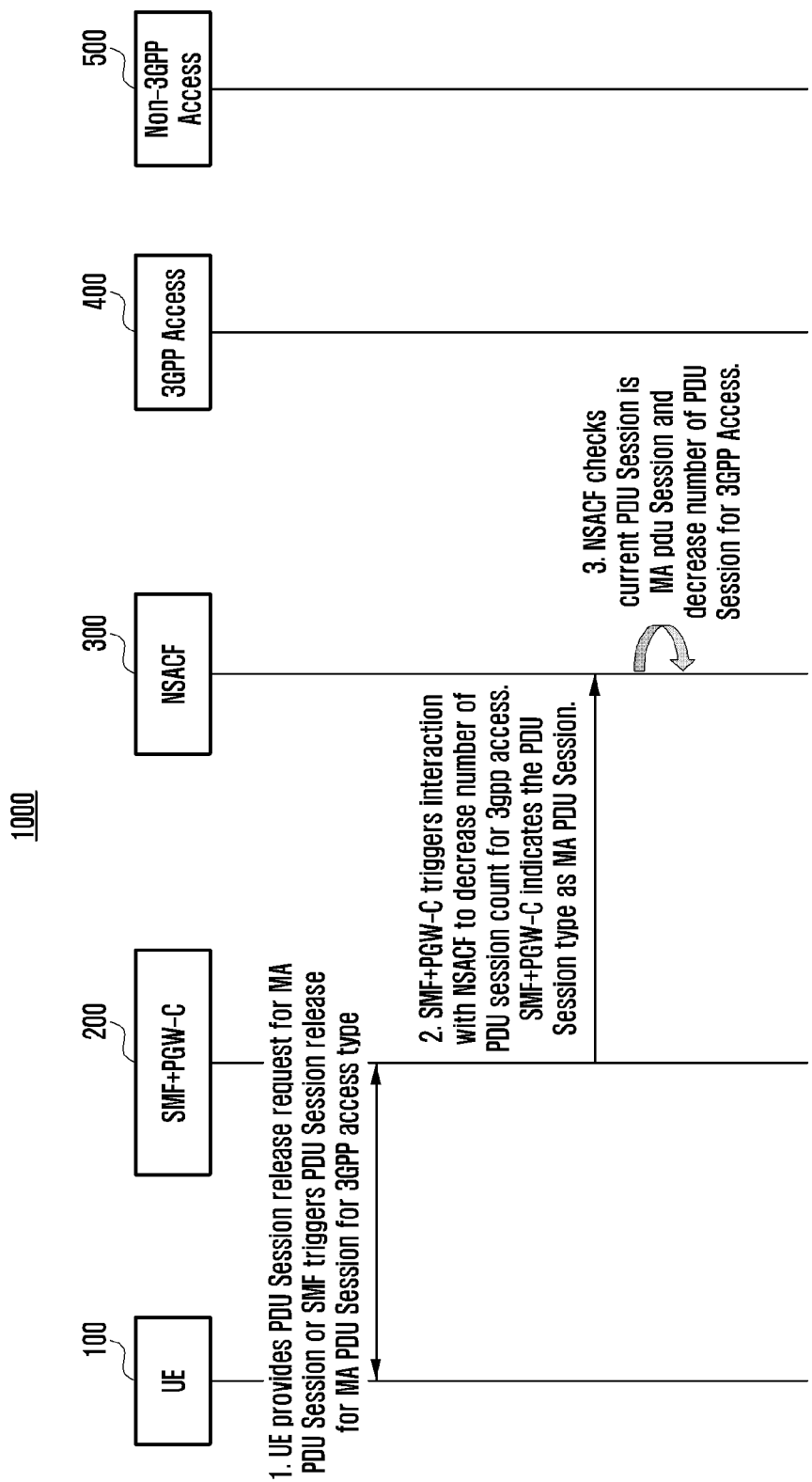

WIRELESS NETWORK AND METHODS TO MAINTAIN MA PDU SESSION AT NSACF

CROSS REFERENCE TO RELATED APPLICATIONS

This application is a continuation of application Ser. No. 17/936,738, filed Sep. 29, 2022, which is based on and claims priority under 35 U.S.C. § 119 to Indian Partial Patent Application No. 202141045063, filed Sep. 30, 2021, and Indian Complete Patent Application No. 202141045063, filed Aug. 29, 2022, both filed in the Indian Intellectual Property Office, the disclosures of which are incorporated by reference herein in their entirety.

BACKGROUND

1. Field

Embodiments disclosed herein relate to wireless networks, and more particularly to managing multi-access protocol data unit (MA PDU) sessions in wireless networks.

2. Description of Related Art

Fifth generation (5G) mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NRU) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

For the maximum number of user equipments (UEs) per network slice admission control, a UE may register or deregister for a single network slice selection assistance information (S-NSSAI) via $3^{rd}$ generation partnership project (3GPP) access and/or non-3GPP access. An access and mobility management function (AMF) provides the access type to a network slice admission control function (NSACF) when triggering a request to increase or decrease the number of UEs. The NSACF takes access type into account for increasing and decreasing the number of UEs per network slice. The NSACF stores a UE identifier (UE ID) with the associated one or more access type(s), i.e., the NSACF is able to add or remove a registration for the UE ID for each access type.

If the UE establishes multiple access PDU sessions on either 3GPP or N3GPP or both access type, the "MA PDU Request" request type in a uplink non-access stratum (UL NAS) transport message indicates to the network that this PDU session establishment request is to establish a new MA PDU session and to apply an access traffic steering switching and splitting lower layer (ATSSS-LL) functionality, or the multipath transmission control protocol (MPTCP) functionality, or both functionalities, for steering the traffic of this MA PDU session.

In case of a MA-PDU session, there is a single PDU session established with a common PDU session ID between both 3GPP access and non-3GPP access type, as per the prior art, during release of MA-PDU session over one access type, the number of PDU session counts may get reduced even though the PDU session may remain active over other access type. This may result in erroneous counting of number of PDU sessions per network slice at NSACF.

FIG. 1 illustrates an example scenario, where the NSACF decrease count of number of PDU sessions for a PDU session ID=1, but the PDU session is still active on non-3GPP access (400) of MA PDU session, which results in the PDU session no longer being counted for the threshold leading to erroneous counting and handling at the network. In step 1, the UE (100) establishes a MA-PDU session (PDU session Id=1) over 3GPP access type for S-NSSAI-A. In step 2, the UE (100) establishes a MA-PDU session (PDU session id=1) over Non-3GPP Access Type for S-NSSAI-A. In step 3, the UE (100) or the network requests to release the PDU session ID 1 over the 3GPP access (400). In step 4, the SMF+PGW-C (200) triggers interaction with the NSACF (300) to decrease number of PDU session counts. In step 5, the NSACF (300) decreases the count of number of PDU sessions. In step 6, the NSACF (300) decreases the count of number of PDU sessions for the PDU session ID=1, but the PDU session is still active on non-3GPP access (500) of MA PDU session. This PDU session is no more counted for the threshold resulting in the erroneous counting of the PDU sessions.

FIG. 2 illustrates an example scenario, wherein the NSACF (300) does not have access to type information and does not know that the PDU session type is MA PDU. As per current prior art, during MA-PDU session establishment, the UE (100) provides request type as "MA PDU request" in UL NAS transport message and its ATSSS Capabilities, in the PDU session establishment request message. The "MA PDU request" request type in the UL NAS transport message indicates to the network that this PDU session establishment request is to establish a new MA PDU session and to apply the ATSSS-LL functionality, or the MPTCP functionality, or both functionalities, for steering the traffic of this MA PDU session. If the AMF supports the MA PDU sessions, then the AMF selects an SMF (200), which supports the MA PDU sessions. The AMF informs the SMF (200) that the request is for a MA PDU session by including "MA PDU request" indication and, in addition, the AMF indicates to SMF (200) whether the UE (100) is registered over both accesses. If the UE (100) is registered over both accesses, while increasing the number of PDU sessions per network slice in the NSACF (300), which access type is to be considered for the MA PDU session, is not defined as per current prior art.

As shown in the FIG. 2, in step 1, the UE (100) provides request type as "MA PDU request" in UL NAS Transport message and its ATSSS Capabilities. In step 2, the AMF supports MA PDU sessions, then the AMF selects an SMF (200), which supports the MA PDU sessions. In step 3, the SMF+PGW-C (200) triggers interaction with the NSACF (300) to increase number of PDU session counts. In step 4, the NSACF (300) does not have access to the type information and does not know that the PDU session type is MA PDU.

Thus, it is desired to address the above mentioned disadvantages or other shortcomings or at least provide a useful alternative.

OBJECTS

The principal object of the embodiments herein is to disclose wireless network and methods to maintain a MA PDU session at a NSACF.

Another object of the embodiments herein is to maintain a MA PDU session at the NSACF by increasing a count per access type for the MA PDU session.

Another object of the embodiments herein is to maintain a MA PDU session at the NSACF by decreasing a count per access type for the MA PDU session during release.

Another object of the embodiments herein is to maintain a MA PDU session at the NSACF by maintaining a single count per access type for the MA PDU session.

Another object of the embodiments herein is to maintain a MA PDU session at the NSACF by decreasing the count per access type for the MA PDU session during release.

Another object of the embodiments herein is to maintain a MA PDU session at the NSACF by converting the MA PDU to a normal PDU.

SUMMARY

Accordingly, the embodiments herein provide methods for managing an MA PDU session in a wireless network. The method includes determining, by a SMF entity, that a PDU session is the MA PDU session based on an indication from a UE. Further, the method includes indicating, by the SMF entity, that the PDU session is the MA PDU session to a NSACF entity in response to determination.

In an embodiment, the PDU session is determined as the MA PDU session, while triggering a request to increase or decrease a number of PDU sessions during a MA PDU session establishment procedure or a PDU session release procedure.

Accordingly, the embodiments herein provide methods for managing a MA PDU session in a wireless network. The method includes receiving, by a NSACF entity, an identification that a PDU session is the MA PDU session. Further, the method includes controlling, by the NSACF entity, a count of access type combination of the PDU session based on an access type configured for a NSAC in the NSACF entity based on the received identification.

In an embodiment, controlling the count of access type combination of the PDU session includes at least one of an increasing the count of access type-combination of the PDU session and a decreasing the count of access type-combination of the PDU session.

In an embodiment, the access type combination includes at least one of a 3GPP access type and a non-3GPP access type.

In an embodiment, the method includes storing, by the NSACF entity, a PDU session ID associated with the access type combination at the NSACF entity.

In an embodiment, the method includes indicating, by the SMF entity, that one of a 3GPP access type PDU session establishment and a non-3GPP access type PDU session establishment is not successful to the UE, upon determining a threshold is reached. The threshold is determined based on existing techniques. Further, the method includes considering, by the SMF entity, the PDU session as a single access PDU session based on the indication.

In an embodiment, the indication is provided in a non-access stratum (NAS) signaling message, wherein the indication comprises of a cause value indicates PDU session establishment is not successful for at least one the access type-combination and a timer value.

Accordingly, the embodiments herein provide a SMF entity for managing a MA PDU session in a wireless network. The SMF entity includes a MA PDU session managing controller coupled with a processor and a memory. The MA PDU session managing controller is configured to determine that a PDU session is the MA PDU session based on an indication from the UE. Further, the MA PDU session managing controller is configured to indicate that the PDU session is the MA PDU session to a NSACF entity in response to determination.

Accordingly, the embodiments herein provide a NSACF entity for managing a MA PDU session in a wireless network. The NSACF entity includes a MA PDU session managing controller coupled with a processor and a memory. The MA PDU session managing controller is configured to receive an identification that a PDU session is the MA PDU session and control a count of access type combination of a PDU session based on an access type configured for the NSAC in the NSACF entity based on the received identification.

Accordingly, the embodiments herein provide a wireless network for managing a MA PDU session. The wireless network includes a NSACF entity and a SMF entity. The SMF entity is configured to determine that a PDU session is the MA PDU session based on an indication from a UE, and indicate that the PDU session is the MA PDU session to the NSACF entity in response to determination. The NSACF entity is configured to receive an identification that the PDU session is the MA PDU session, and control a count of access type combination of the PDU session based on an access type configured for a network slice admission control (NSAC) in the NSACF entity based on the received identification.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "control-ler" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 5 illustrates an example sequential flow diagram of a decreasing of a count per access type for MA PDU session during release according to embodiments of the present disclosure;

FIG. 6 illustrates an example sequential flow diagram of a threshold reached case according to embodiments of the present disclosure;

FIGS. 7A and 7B illustrate example scenarios in which the count per access type is decreased for the MA PDU session during release according to embodiments of the present disclosure;

DETAILED DESCRIPTION

Figure 1:
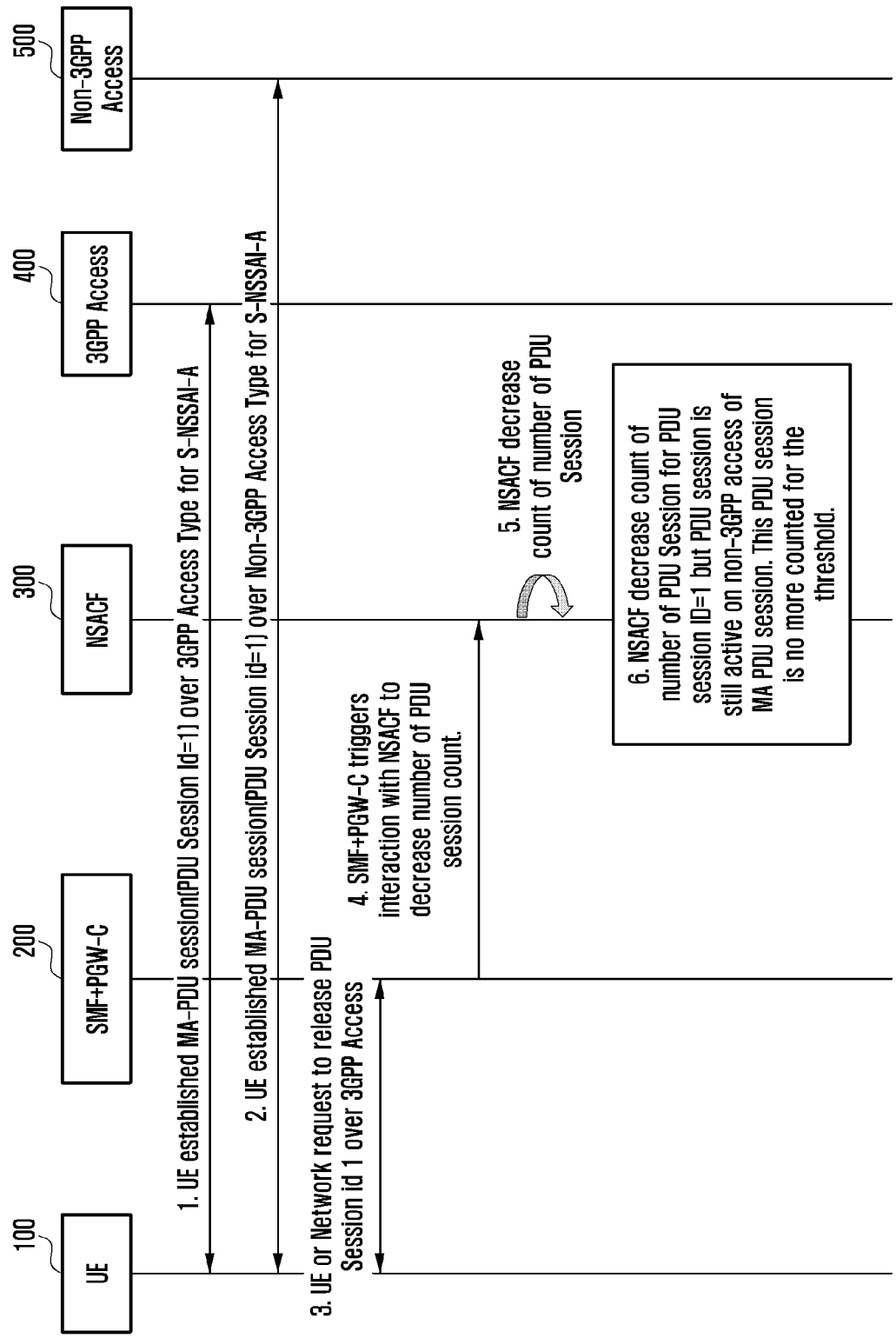
FIG. 1 illustrates an example scenario, where the NSACF decrease count of number of PDU sessions for a PDU session ID=1, but the PDU session is still active on non-3GPP access of MA PDU session, which results in the PDU session no longer being counted for the threshold according to prior arts.
Figure 2:
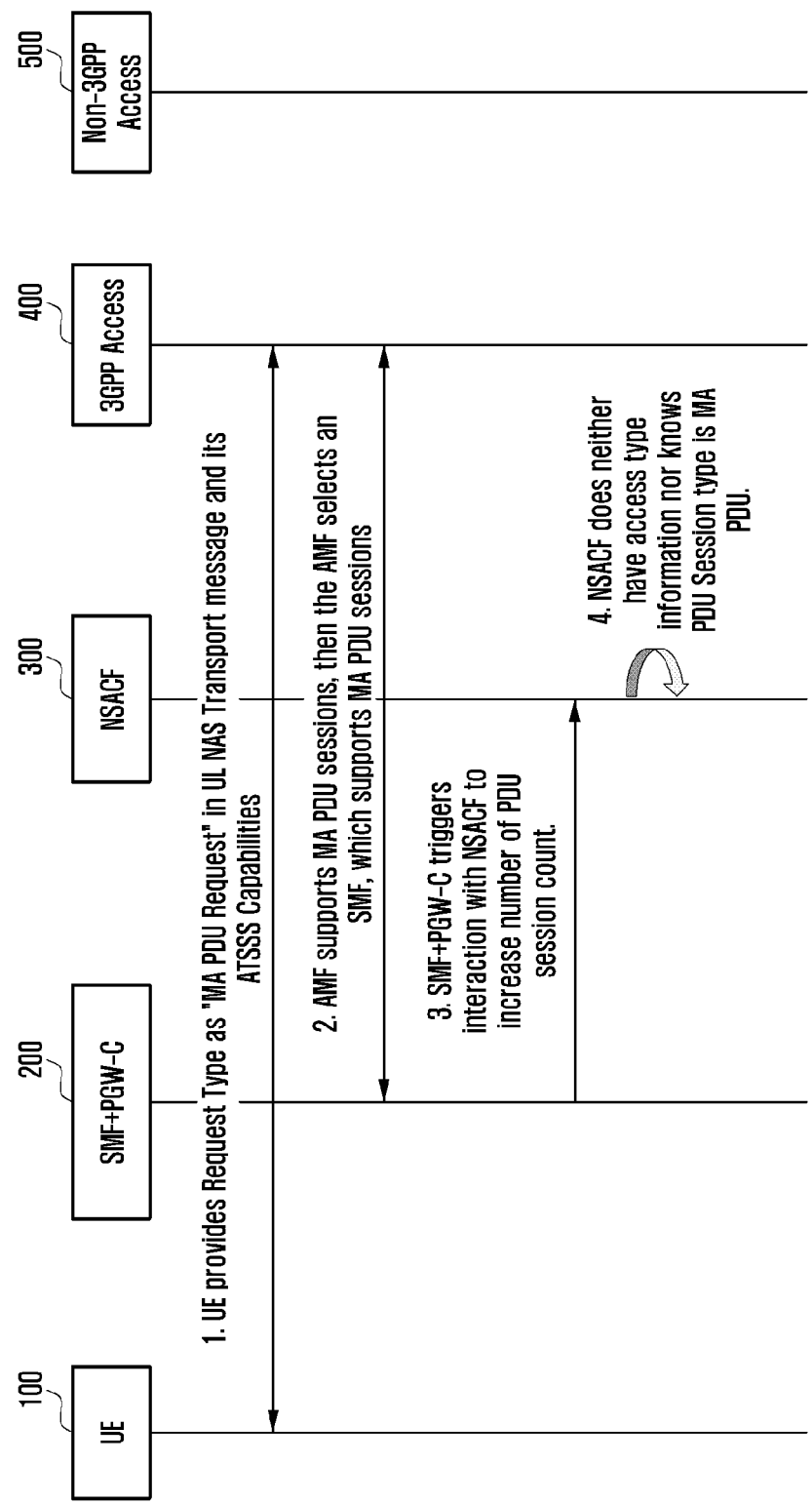
FIG. 2 illustrates an example scenario in which the NSACF does not have access to type information and does not know that the PDU session type is MA PDU according to prior arts.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and a wireless network for managing a MA PDU session in the wireless network. The method includes determining, by a SMF entity, that a PDU session is the MA PDU session based on an indication from a UE. Further, the method includes indicating, by the SMF entity, that the PDU session is the MA PDU session to a NSACF entity in response to determination.

In an embodiment, the SMF entity indicates to the NSACF entity that the PDU session is for multiple access type then the NSACF entity increases the count of number of PDU sessions separately for each access type. Further, if release procedure is executed then, the SMF indicates that a MA PDU session is released. Further, the NSACF entity automatically reduces the count on both the accesses, if only one of the access is released, this is indicated to the NSACF entity which may release the respective access type. Hence, the accurate count is maintained at the NSACF entity.

In an embodiment, if threshold is reached then, the NSACF entity indicates to the SMF entity, the Access type-combination on which establishing the PDU session is not successful. The SMF entity indicates to the UE in one of the 5GMM or 5GSM signaling message, the cause, back-off timer, access-type combination on which establishing the MA PDU session is not successful. The UE attempts again on respect access type-combination after back-off timer is expired. The wireless network may maintain the count accurately even though the PDU session is a MA PDU session. Referring now to the drawings, and more particularly to FIGS. 3 through 14, where similar reference characters denote corresponding features consistently throughout the figures, there are shown at least one embodiment.

In an embodiment, the SMF+PGW-C can be the SMF alone or packet data network (PDN) gateway (PGW) alone or a combined node, performing the actions discussed herein.

In an embodiment, on 3GPP access of MA PDU session can be applicable to one of an evolved packet system (EPS) and a 5G core (5GC).

In an embodiment, the indication of the MA PDU session from SMF to NSACF is optional. The NSACF can increase or decrease based on access type as discussed herein.

Figure 3:
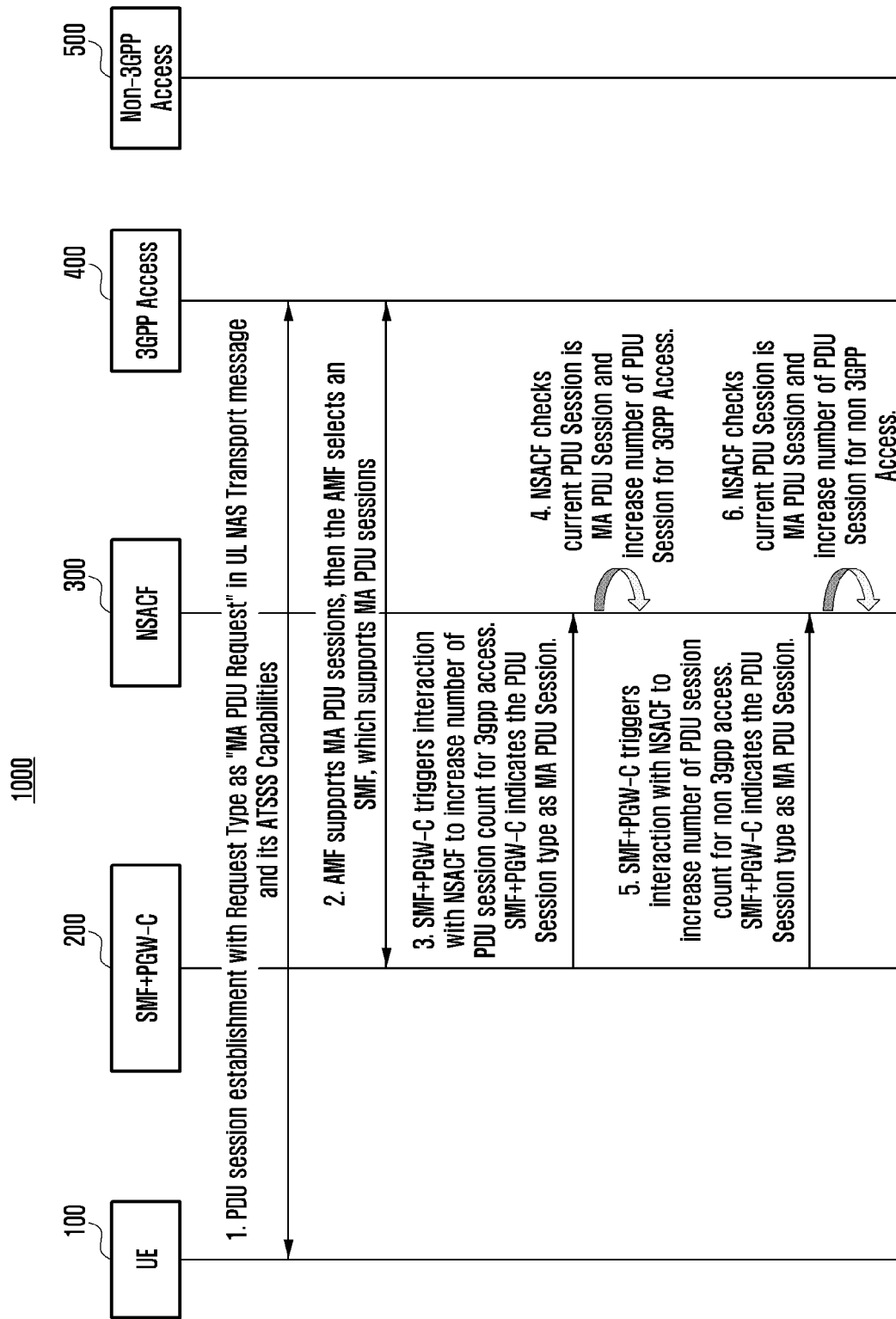
FIG. 3 illustrates an example scenario in which a count per access type is increased for the MA PDU session according to embodiments of the present disclosure.

FIG. 3 illustrates example scenario in which the count per access type is increased for the MA PDU session. The NSACF (300) controls (i.e., increases or decreases) the current number of PDU sessions per network slice, so that the current number of PDU sessions does not exceed the maximum number of PDU sessions allowed to be served by that network slice. As per the provided method, the SMF (200) provides the access type to the NSACF (300), when triggering a request to increase the number of PDU sessions during MA PDU session establishment on one or both the access types as applicable. The user plane resources of one access type of MA PDU session may be established at a later point, when the UE (100) and a network deem necessary.

The SMF (200) may also provide the PDU session type as a MA PDU session to the NSACF (300). The NSACF (300) may also determine a PDU session as a MA PDU session, if the same PDU session ID, UE ID is received on both 3GPPA and N3GPPA. The NSACF (300) takes the access type and/or the PDU session type into account for increasing the number of PDUs per network slice. The NSACF (300) stores the PDU session ID with the associated one or more access type(s), i.e., the NSACF (300) is able to add a PDU session ID for each access Type for MA PDU sessions. When the current number of PDU sessions with the network slice is to be increased for the MA PDU session for any of the access type, the NSACF (300) first checks whether the maximum number of PDU sessions for that network slice has already been reached.

In step 1, the PDU session establishment with request type as "MA PDU request" is sent by the UE (100) in UL NAS transport message and its ATSSS capabilities. In step 2, the AMF supports the MA PDU sessions, then the AMF selects the SMF (200), which supports the MA PDU sessions. In step 3, the SMF+PGW-C (200) triggers interaction with the NSACF (300) to increase the number of PDU session counts for the 3GPP access (400). The SMF+PGW-C (200) indicates the PDU session type as MA PDU session. In step 4, the NSACF (300) checks if the current PDU session is a MA PDU session and increases the number of PDU sessions for 3GPP access (400). In step 5, the SMF+PGW-C (200) triggers an interaction with the NSACF (300) to increase the number of PDU session counts for non 3GPP access (500). The SMF+PGW-C (200) indicates the PDU session type as a MA PDU session. In step 6, the NSACF (300) checks if the current PDU session is a MA PDU session and increases the number of PDU sessions for non-3GPP access (500) (if the current PDU session is a MA PDU session).

Figure 4:
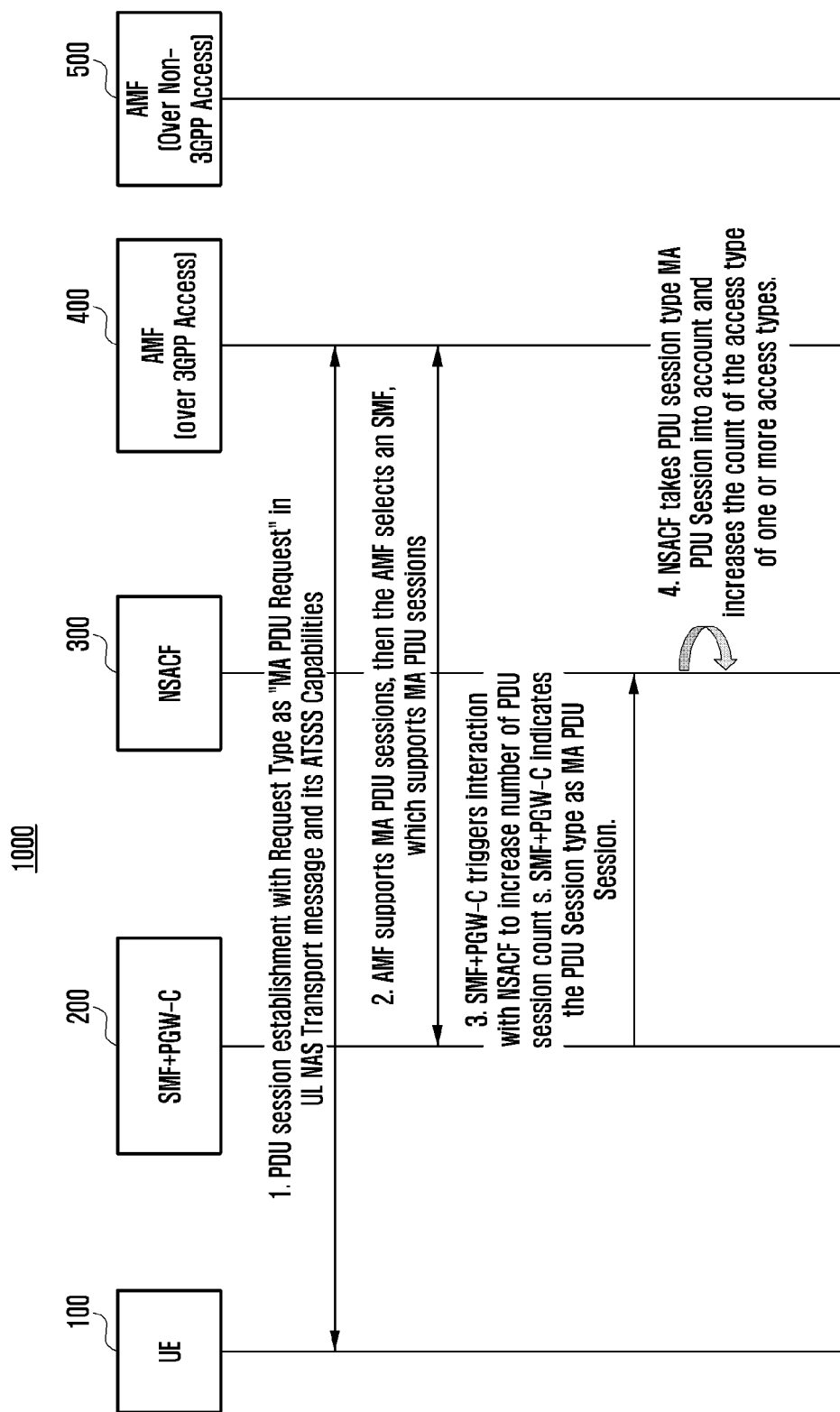
FIG. 4 illustrates an example sequential flow diagram of an increasing count per access type for MA PDU session according to embodiments of the present disclosure.

FIG. 4 illustrates an example sequential flow diagram of increasing count per access type for a MA PDU session according to embodiments of the present disclosure.

At 1, the PDU session establishment with a request type as "MA PDU request" in UL NAS transport message and its ATSSS capabilities is shared between the UE (100) and the AMF over the 3GPP access (400). At 2, the AMF supports the MA PDU sessions, then the AMF selects an SMF, which supports MA PDU sessions. At 3, the SMF+PGW-C triggers (200) interaction with the NSACF (300) to increase number of PDU session counts. The SMF+PGW-C (200) indicates the PDU session type as an MA PDU session for example the SMF+PGW-C (200) indicates the PDU session as an MA PDU session by providing multiple access types/additional access type to the NSACF (300).

At 4, the NSACF (300) identifies that a PDU session is a MA PDU session based on indication from SMF+PGW-C (200) and and controls the count of access type combination of the PDU session based on the access type configured for the NSAC. That is, if the NSACF (300) is configured to count 3GPP access count then the NSACF (300) increases the count of 3GPP access, if the NSACF (300) is configured to count non-3GPP access count then NSACF (300) increases the count of non-3GPP access. If the NSACF (300) is configured to count both 3GPP access and non-3GPP access then NSACF (300) increases the count of both the 3GPP access and non-3GPP access.

FIG. 5 illustrates an example sequential flow diagram of decreasing count per access type for a MA PDU session during release according to embodiments of the present disclosure.

At 1, the PDU session release triggered by the UE (100) or network request for a MA PDU session or the SMF triggers the PDU session release for the MA PDU session for both access type. At 2, the SMF+PGW-C (200) triggers interaction with the NSACF (300) to decrease number of PDU session counts because the PDU session has to be released on both the legs of 3GPP access and non-3GPP access. The SMF+PGW-C (200) indicates the PDU session type as the MA PDU session for example the SMF+PGW-C (200) indicates the PDU session as a MA PDU session by providing multiple access types/additional access type to the NSACF (300). At 3, the NSACF (300) identifies that the PDU session is a MA PDU session based on indication from the SMF+PGW-C (200) and and controls the count of access type combination of the PDU session based on the access type configured for the NSAC. That is, if the NSACF (300) is configured to count 3GPP access count then the NSACF (300) decreases the count of 3GPP access. If the NSACF (300) is configured to count the non-3GPP access count then the NSACF (300) decrease the count of non-3GPP access. If NSACF is configured to count both 3GPP access and non-3GPP access then the NSACF (300) decreases the count of both the 3GPP access and non-3GPP access.

FIG. 6 illustrates an example sequential flow diagram of a threshold reached case according to embodiments as of the present disclosure.

At 1, the PDU session establishment with request type as "MA PDU request" in UL NAS Transport message and its ATSSS capabilities is transferred between the UE (100) and the AMF over the 3GPP access (400). At 2, the AMF supports the MA PDU sessions, then the AMF selects the SMF, which supports a MA PDU sessions. At 3, the SMF+ PGW-C (200) triggers the interaction with the NSACF (300) to increase number of PDU session counts. The SMF+ PGW-C (200) indicates the PDU session type as MA PDU session for example the SMF+PGW-C (200) indicates the PDU session as a MA PDU session by providing multiple access types/additional access type to the NSACF (300).

At 4, the NSACF (300) identifies that a PDU session is a MA PDU session based on indication from SMF+PGW-C (200) and and controls the count of access type combination of the PDU session based on the access type configured for the NSAC. That is, if the NSACF (300) is configured to count 3GPP access count then the NSACF (300) increases the count of 3GPP access, the if NSACF (300) is configured to count non-3GPP access count then the NSACF (300) increases the count of non-3GPP access. If the NSACF (300) is configured to count both 3GPP access and non-3GPP access then the NSACF (300) increases the count of both the 3GPP access and non-3GPP access.

At 5, if at least one of the access type count threshold is reached (i.e. already maximum allowable PDU sessions are established for a given access) then the NSACF (300) indicates failure to the SMF+PGW-C (300). The NSACF (300) indicates "maximum number of PDU sessions per S-NSSAI reached" associated with the access type. At 6, the SMF-PGW-C (200) sends the PDU session establishment reject/PDU session establishment accept or any other 5GSM/5GMM signaling message with the result indication including "maximum number of PDU sessions per S-NSSAI reached," optionally a back-off timer and the access type to the UE (100). The UE (100) may consider that PDU session establishment was not successful for the access type indicated by the SMF. The access type can be 3GPP access, non-3GPP access or both 3GPP access and non-3GPP access. The UE (100) is expected to retry the establishment of the PDU session on the failed access again optionally after the back-off timer is expired.

FIGS. 7A and 7B illustrate example scenarios in which the count per access type is decreased for the MA PDU session during release. As per the provided method, the SMF (200) provides the access type to the NSACF (300), when triggering a request to decrease the number of PDUs during the MA PDU session release on one or both the access types as applicable. The SMF (200) may also provide the PDU session type as a MA PDU session to the NSACF (300). The NSACF (300) takes an access type and/or a PDU session type into account for decreasing the number of PDUs per network slice. The NSACF (300) stores the PDU session ID with the associated one or more access type(s), i.e. the NSACF (300) is able to remove PDU session ID for each access Type for the MA PDU sessions.

Referring to FIG. 7A, in step 1, a PDU session release is triggered by the UE (100) or the network request for the MA PDU session or the SMF (200) triggers the PDU session release for the MA PDU session for both access types. In step 2, the SMF+PGW-C (200) triggers an interaction with the NSACF (300) to decrease the number of PDU session counts for 3GPP access (400). The SMF+PGW-C (200) indicates the PDU session type as a MA PDU session. In step 3, the NSACF (300) checks if the current PDU session is a MA PDU session and decreases the number of PDU sessions for 3GPP access (400). In step 4, the SMF+PGW-C (200) triggers an interaction with the NSACF (300) to decrease the number of PDU session counts for non 3GPP access (400). The SMF+PGW-C (200) indicates the PDU session type as a MA PDU session. In step 5, the NSACF (300) checks if the current PDU session is a MA PDU session and decreases the number of PDU sessions for non 3GPP access (400).

Referring to FIG. 7B, in step 1, the UE (100) provides a PDU session release request for the MA PDU session or the SMF (200) triggers a PDU session release for the MA PDU session for 3GPP access type. In step 2, the SMF+PGW-C (200) triggers the interaction with the NSACF (300) to decrease the number of PDU session counts for the 3GPP access (400). The SMF+PGW-C (200) indicates the PDU session type as a MA PDU session. In step 3, the NSACF (300) checks if the current PDU session is a MA PDU session and decreases the number of PDU sessions for 3GPP access (400).

Figure 8:
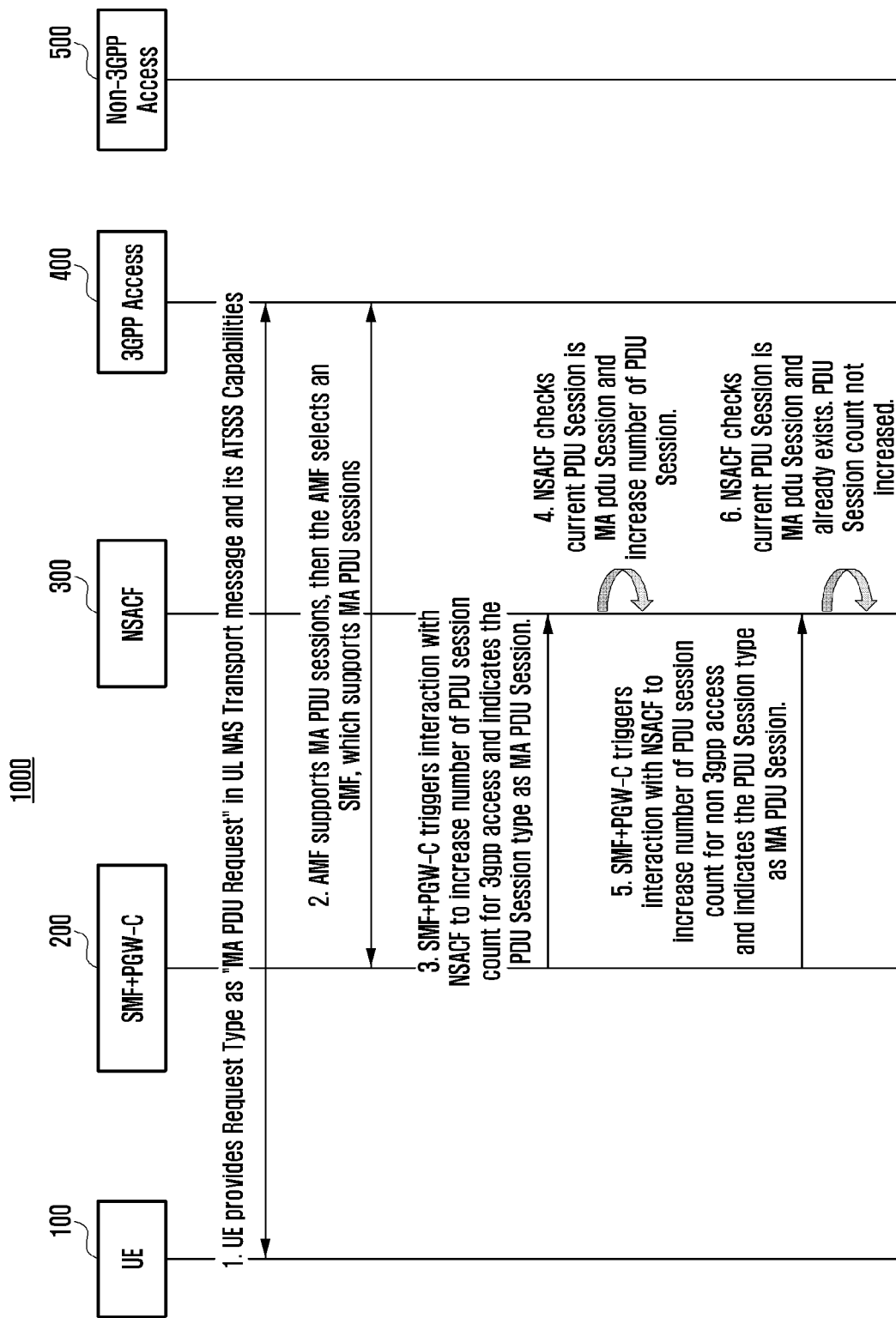
FIG. 8 illustrates an example scenario in which a single count per access type is maintained for the MA PDU session according to embodiments of the present disclosure.

FIG. 8 illustrates an example scenario in which the single count per access type is maintained for the MA PDU session. The NSACF (300) controls (i.e., increases or decreases) the current number of PDU sessions per network slice, so that the current number of PDU sessions does not exceed the maximum number of PDU sessions allowed to be served by that network slice. As per the provided method, the SMF (200) provides the PDU session type as a MA PDU to the NSACF (300), when triggering a request to increase the number of PDU sessions during MA PDU session establishment on one or both the access types (as applicable). The NSACF (300) may also determine a PDU session as a MA PDU session, if the same PDU session ID, a UE ID is received on both 3GPPA and N3GPPA. The NSACF (300) increases the number of PDU sessions only once for a MA PDU session irrespective of access type(s).

In step 1, the UE (100) provides the request type as "MA PDU request" in UL NAS transport message and its ATSSS capabilities. In step 2, the AMF supports the MA PDU sessions, then the AMF selects an SMF (200), which supports the MA PDU sessions. In step 3, the SMF+PGW-C (200) triggers an interaction with the NSACF (300) to increase the number of PDU session counts for 3GPP access (400) and indicates the PDU session type as a MA PDU session. In step 4, the NSACF (300) checks if the current PDU session is a MA PDU session and increases the number of PDU sessions. In step 5, the SMF+PGW-C (200) triggers an interaction with the NSACF (300) to increase the number of PDU session counts for non 3GPP access (400) and indicates the PDU session type as a MA PDU session. In step 6, the NSACF (300) checks if the current PDU session is a MA PDU session and already exists, the PDU session count may not be increased. In step 7, the NSACF (300) identifies that a given PDU session ID is a MA PDU session, when the MA PDU session is indicated from the SMF (200) or if the PDU session ID is the same for both 3GPP access type and non-3GPP access type. A MA PDU session second request to increase the PDU session count of second access type is neglected by the NSACF (300) and is not counted against the threshold.

Figure 9:
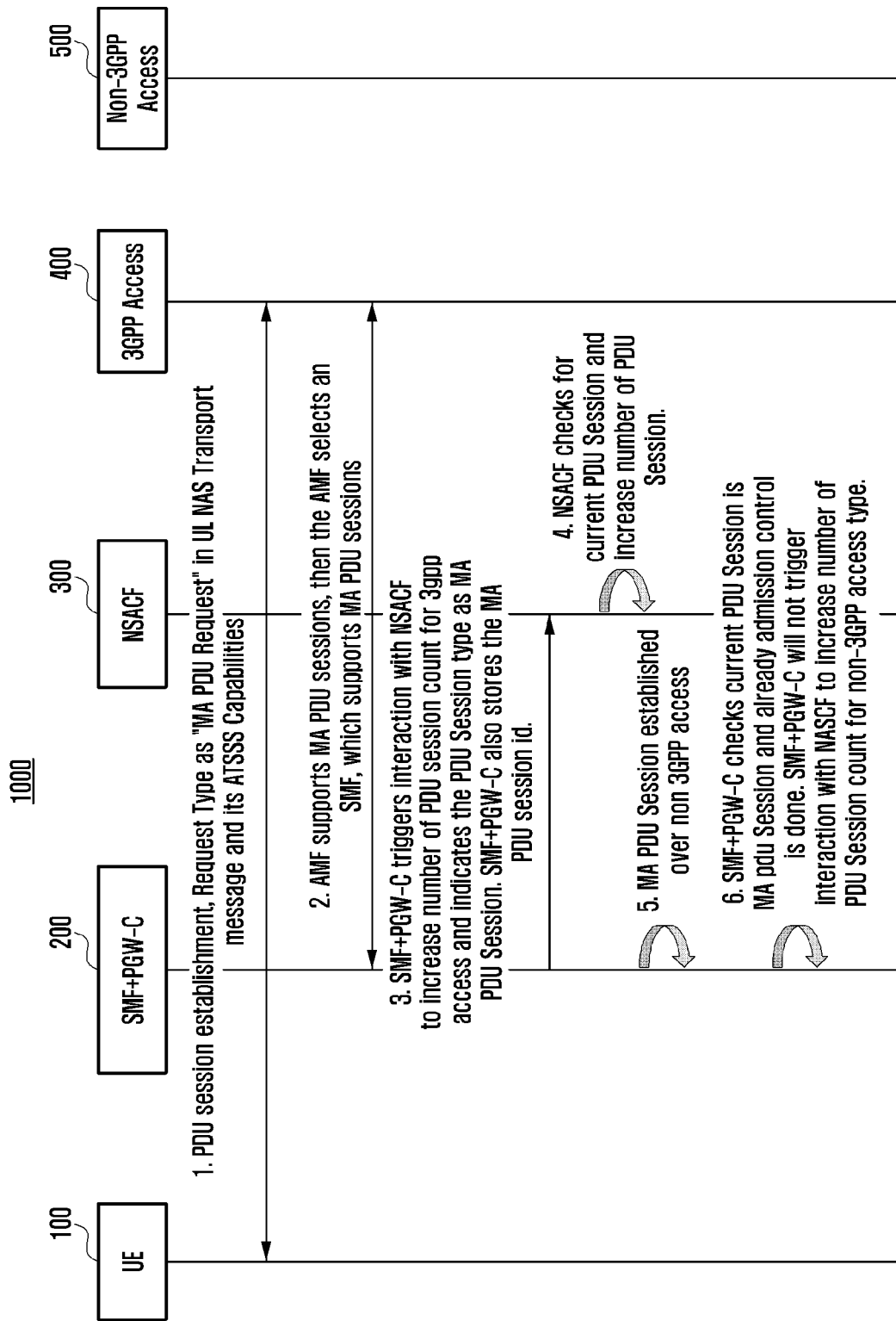
FIG. 9 illustrates an example scenario in which a single count per access type is maintained for the MA PDU session according to embodiments of the present disclosure.

FIG. 9 illustrates an example scenario in which a single count per access type is maintained for the MA PDU session. In step 1, the PDU session establishment, request type are sent by the UE (100) as "MA PDU request" in UL NAS transport message and its ATSSS capabilities. In step 2, the AMF supports the MA PDU sessions, then the AMF selects an SMF (200), which supports the MA PDU sessions. In step 3, the SMF+PGW-C (200) triggers an interaction with the NSACF (300) to increase the number of PDU session counts for 3GPP access (400) and indicates the PDU session type as a MA PDU session. SMF+PGW-C (200) also stores the MA PDU session ID. In step 4, the NSACF (300) checks if the current PDU session is a MA PDU session and increases the number of PDU sessions. In step 5, the MA PDU session is established over non 3GPP access (500). In step 6, the SMF+PGW-C (200) checks if the current PDU session is a MA PDU session and admission control has already been done. The SMF+PGW-C (200) may not trigger interaction with the NSACF (300) to increase the number of PDU session counts for non-3GPP access type. Thus, maintaining the single count. Similarly, when the PDU session is released, the SMF+PGW-C (200) may trigger an interaction with the NSACF (300) to decrease the number of PDU session counts when the PDU session is released, i.e., on both the access types. When the PDU session or user plane resources are released on first access type, but second access type PDU session is active of MA-PDU session, then the SMF+PGW-C (200) does not trigger an interaction with the NSACF (300) to decrease the number of PDU session counts.

Figure 10:
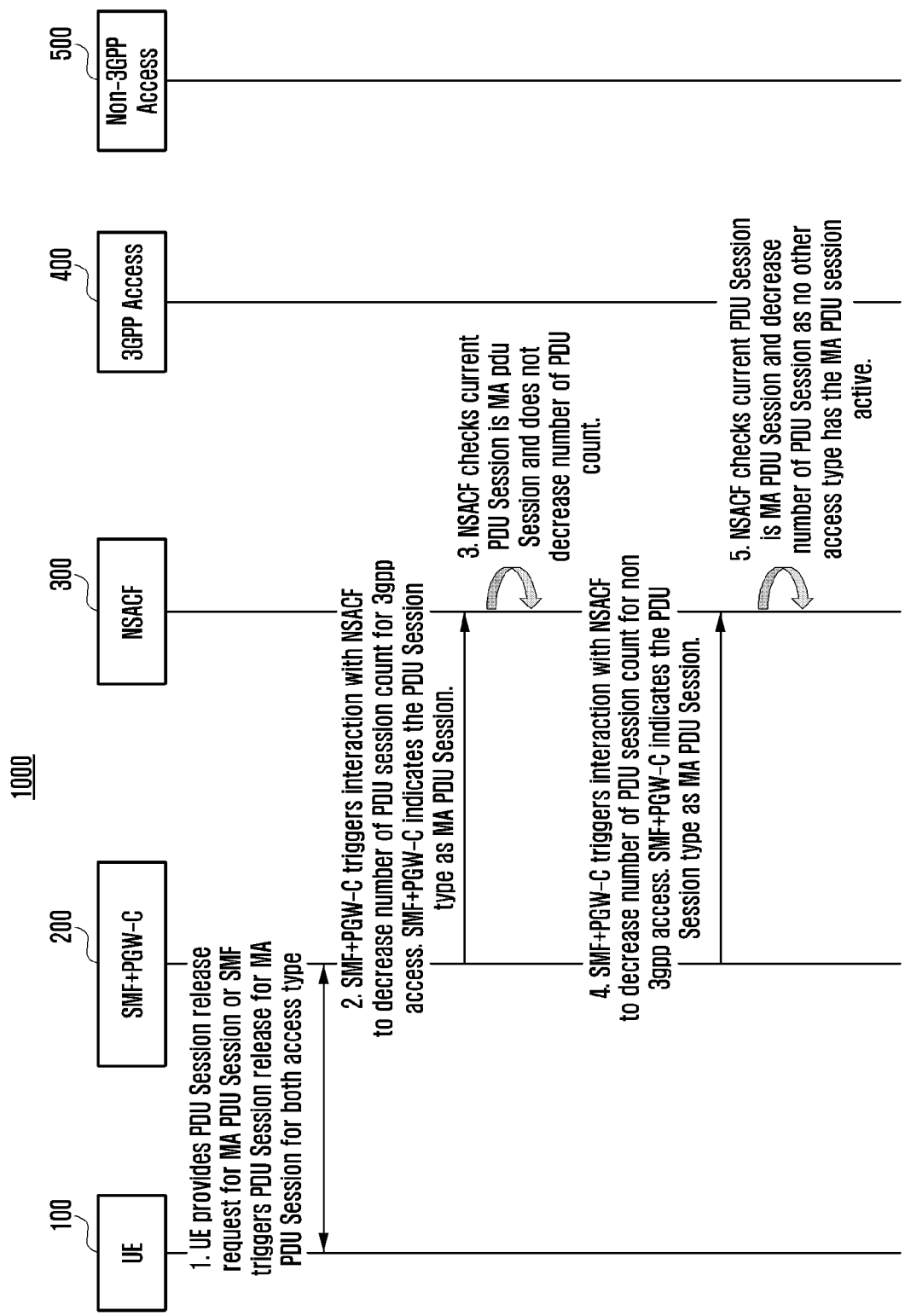
FIG. 10 illustrates an example scenario in which the count per access type is decreased for the MA PDU session during release according to embodiments of the present disclosure.

FIG. 10 illustrates an example scenario in which the count per access type is decreased for the MA PDU session during release. As per the provided method, the SMF (200) provides the PDU session type as a MA PDU session to the NSACF (300), when triggering a request to decrease the number of PDUs during MA PDU session release on one or both the access types as applicable. The NSACF (300) takes PDU session type into account for decreasing the number of PDUs per network slice. The NSACF (300) removes the PDU session ID for the MA PDU session only, when the PDU session is being released for all corresponding access types.

In step 1, the UE (100) provides a PDU session release request for MA PDU session or SMF (200) triggers PDU session release for a MA PDU session for both access types. In step 2, the SMF+PGW-C (200) triggers an interaction with the NSACF (300) to decrease the number of PDU session counts for 3GPP access (400). The SMF+PGW-C (200) indicates the PDU session type as MA PDU session. In step 3, the NSACF (300) checks if the current PDU session is a MA PDU session and does not decrease the number of PDU counts. In step 4, the SMF+PGW-C (200) triggers an interaction with the NSACF (300) to decrease the number of PDU session counts for non 3GPP access (500). The SMF+PGW-C (200) indicates the PDU session type as a MA PDU session. In step 5, the NSACF (300) checks if the current PDU session is a MA PDU session and decreases the number of PDU sessions as no other access type has the MA PDU session active.

Embodiments herein can convert the MA PDU to a normal PDU. While indicating the increment for the second access type, if the threshold is reached, then the MA-PDU session is converted into a normal PDU session; i.e., in response to PDU session establishment request requesting to establish the MA PDU session, the SMF (200) may indicate to the UE (100) that one of the access either 3GPP access type or non-3GPP access type PDU session establishment is not successful and this PDU session may be considered as single access PDU session. The SMF (200) can decide based on the access type on which SMF (200) received the PDU session establishment request only to be allowed.

For this, SMF (200) always sends NSACF_PDU session increment requests for the first access type (e.g., 3GPP access type) on which the SMF received PDU session establishment request message from the UE. Once this check is successful and is allowed, the second PDU session establishment check i.e. NSACF_PDU session increment requests for second access i.e. other access type (for e.g., non-3GPP access type) is sent and if the second access type check is also successful, then the MA PDU session is established. The SMF (200) indicates to the UE (100) in the NAS signalling message like 5GMM or 5GSM signalling message that this request to establish a MA PDU session is not successful and the current PDU session has to be considered as a single access PDU session.

In yet another embodiment, the SMF (200) can indicate cause (for e.g., congestion) to the UE (100) along with the timer and indicate the PDU session establishment has failed to establish, UE (100) is expected to retry the establishment of the PDU session again optionally after the congestion timer is expired. Meanwhile as the PDU session establishment for the first access type was successful SMF (200) may send NSACF_PDU session decrement requests for the first access type (e.g., 3GPP access type) of this PDU session. When the UE (100) (after the optionally congestion timer expires) may retry again, the SMF (200) may requests to increment again for both the access types.

Figure 11:
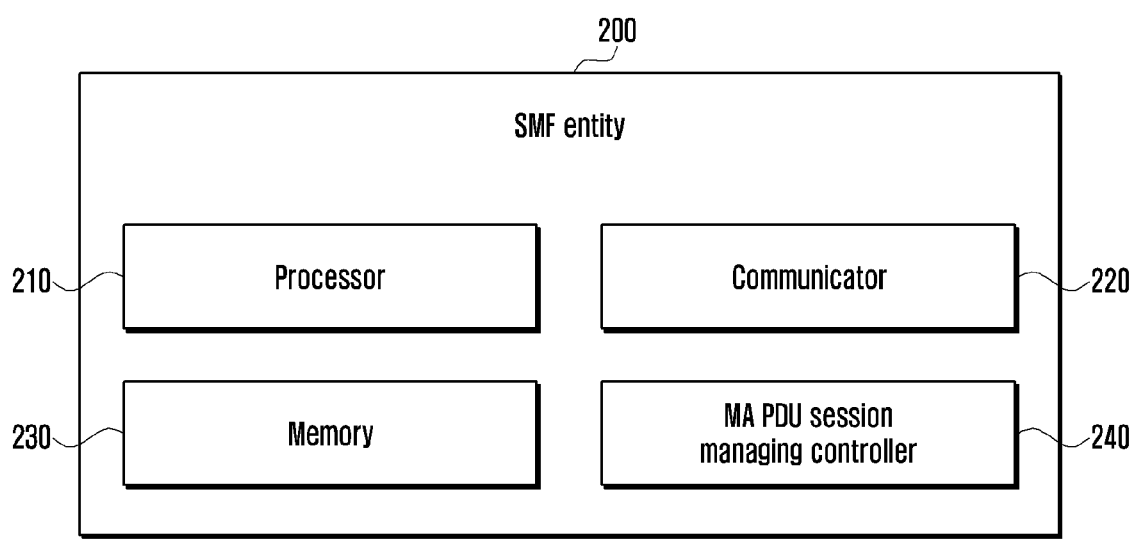
FIG. 11 illustrates various hardware components of a SMF (e.g., SMF entity) for managing MA PDU session in a wireless network according to embodiments of the present disclosure.

FIG. 11 illustrates various hardware components of the SMF entity (200) for managing a MA PDU session in the wireless network (1000) according to embodiments of the present disclosure. In an embodiment, the SMF entity (200) includes a processor (210), a communicator (220), memory (230) and a MA PDU session managing controller (240). The processor (210) is coupled with the communicator (220), the memory (230) and the controller (240).

The MA PDU session managing controller (240) determines that the PDU session is the MA PDU session based on an indication from the UE (100). Further, the MA PDU session managing controller (240) indicates that the PDU session is the MA PDU session to the NSACF entity (300) in response to determination.

The MA PDU session managing controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in random access memory (RAM) or cache).

Although the FIG. 11 illustrates various hardware components of the SMF entity (200) but it is to be understood that other embodiments are not limited thereon. In other embodiments, the SMF entity (200) may include less or more number of components. Further, the labels or names of the components are used only for illustrative purpose and does not limit the scope of the present disclosure. One or more components can be combined together to perform same or substantially similar function in the SMF entity (200).

Figure 12:
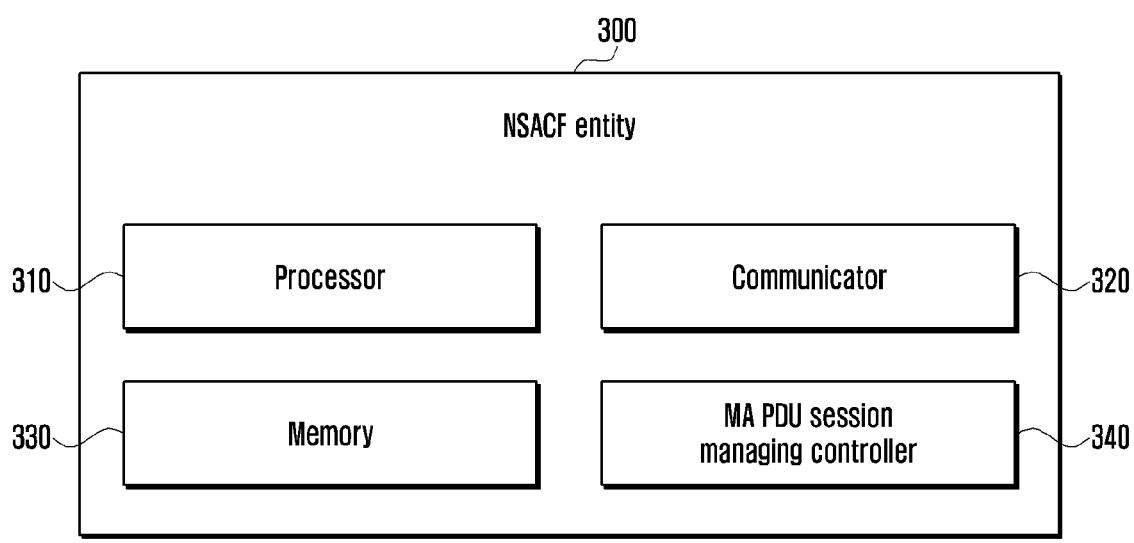
FIG. 12 illustrates various hardware components of a NSACF (e.g., NSACF entity) for managing MA PDU session in the wireless network according to embodiments of the present disclosure.

FIG. 12 illustrates various hardware components of the NSACF entity (300) for managing a MA PDU session in the wireless network (1000) according to the embodiments of the present disclosure. In an embodiment, the NSACF entity (300) includes a processor (310), a communicator (320), memory (330) and a MA PDU session managing controller (340). The processor (310) is coupled with the communicator (320), the memory (330) and the MA PDU session managing controller (340).

The MA PDU session managing controller (340) receives the identification that the PDU session is the MA PDU session and controls the count of access type combination of the PDU session based on the access type configured for the NSAC in the NSACF entity (300) based on the received identification. Further, the MA PDU session managing controller (340) stores the PDU session ID associated with the access type combination at the NSACF entity (300).

The MA PDU session managing controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (310) is configured to execute instructions stored in the memory (330) and to perform various processes. The communicator (320) is configured for communicating internally between internal hardware components and with external devices via one or more networks. The memory (330) also stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in random access memory (RAM) or cache).

Although the FIG. 12 illustrates various hardware components of the NSACF entity (300) but it is to be understood that other embodiments are not limited thereon. In other embodiments, the NSACF entity (300) may include less or more number of components. Further, the labels or names of the components are used only for illustrative purpose and does not limit the scope of the present disclosure. One or more components can be combined together to perform same or substantially similar function in the NSACF entity (300).

Figure 13:
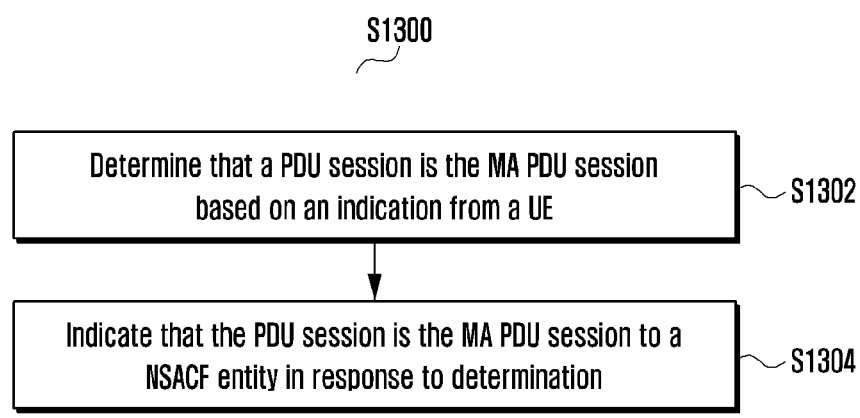
FIG. 13 illustrates a flow chart of a method, implemented by the SMF entity, for managing the MA PDU session in the wireless network according to of the present disclosure.

FIG. 13 illustrates a flow chart (S1300) of a method, implemented by the SMF entity (200), for managing the MA PDU session in the wireless network (1000) according to embodiments of the present disclosure.

As shown in the FIG. 13, the operations (S1302 and S1304) are handled by the MA PDU session managing controller (240). At S1302, the method includes determining that the PDU session is the MA PDU session based on an indication from the UE (100). At S1304, the method includes indicating that the PDU session is the MA PDU session to the NSACF entity (300) in response to determination.

Figure 14:
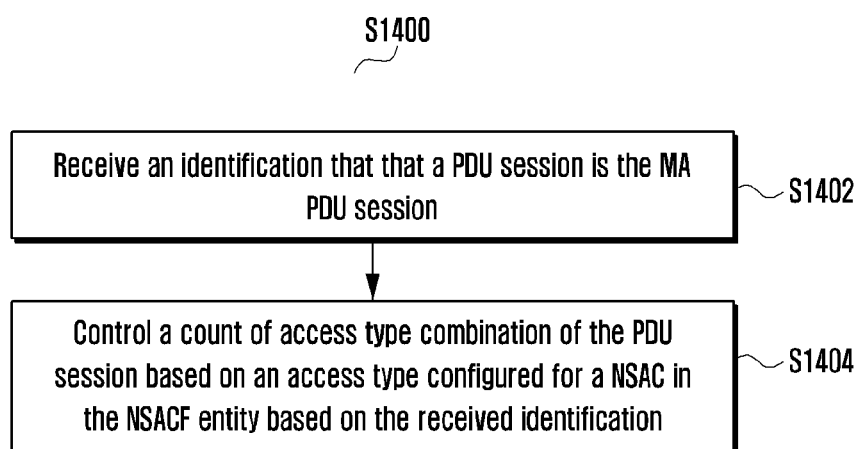
FIG. 14 illustrates a flow chart of a method, implemented by the NSACF entity, for managing the MA PDU session in the wireless network according to the present disclosure.

FIG. 14 illustrates a flow chart (S1400) of a method, implemented by the NSACF entity (300), for managing the MA PDU session in the wireless network (1000) according to embodiments of the present disclosure.

As shown in the FIG. 14, the operations (S1402 and S1404) are handled by the MA PDU session managing controller (340). At S1402, the method includes receiving the identification that the PDU session is the MA PDU session. At S1404, the method includes controlling the count of access type combination of the PDU session based on the access type configured for the NSAC in the NSACF entity (300) based on the received identification.

Based on the provided methods, the wireless network may maintain the count accurately even though the PDU session is a MA PDU session.

The various actions, acts, blocks, steps, or the like in the flow charts (S1300 and S1400) may be performed in the order presented, in a different order or simultaneously. Further, in some embodiments, some of the actions, acts, blocks, steps, or the like may be omitted, added, modified, skipped, or the like without departing from the scope of the present disclosure.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) entity for managing a multiple access protocol data unit (MA PDU) session in a wireless communication network, the method comprising:
    receiving, from a user equipment (UE), a message indicating that a protocol data unit (PDU) session is the MA PDU session;
    transmitting, to a network slice admission control function (NSACF) entity, a PDU session update request message including information on multiple access types and a request to increase or decrease a number of PDU sessions per single-network slice selection assistance information (S-NSSAI), wherein the information on multiple access types includes a first access type and an additional access type; and
    receiving, from the NSACF entity, a result indication for each of the multiple access types.

2. The method of claim 1,
    wherein increasing or decreasing the number of PDU sessions per the S-NSSAI is performed during an MA PDU session establishment procedure or a PDU session release procedure.

3. The method of claim 1,
    wherein the first access type indicates one of a 3rd generation partnership project (3GPP) access type or a non-3GPP access type and the additional access type indicates the other of the 3GPP access type or the non-3GPP access type.

4. The method of claim 1,
    wherein the result indication includes information on whether a maximum number of PDU sessions per S-NSSAI is reached or not.

5. A method performed by a network slice admission control function (NSACF) entity for managing a multiple access protocol data unit (MA PDU) session in a wireless communication network, the method comprising:
    receiving, from a session management function (SMF) entity, a protocol data unit (PDU) session update request message including information on multiple access types and a request to increase or decrease a number of PDU sessions per single-network slice selection assistance information (S-NSSAI), wherein the information on multiple access types includes a first access type and an additional access type;
    updating the number of PDU sessions per the S-NSSAI based on the information on multiple access types and the request; and
    transmitting, to the SMF entity, a result indication for each of the multiple access types.

6. The method of claim 5,
    wherein updating the number of PDU sessions comprises one of increasing the number of the PDU sessions or decreasing the number of the PDU sessions per the S-NSSAI based on the information on multiple access types and the request.

7. The method of claim 5,
    wherein the first access type indicates one of a 3rd generation partnership project (3GPP) access type or a non-3GPP access type and the additional access type indicates the other of the 3GPP access type or the non-3GPP access type.

8. The method of claim 5, further comprising:
    identifying whether a maximum number of PDU sessions per S-NSSAI is reached.

9. The method of claim 5,
    wherein the result indication includes information on whether a maximum number of PDU sessions per S-NSSAI is reached or not.

10. A session management function (SMF) entity for managing a multiple access protocol data unit (MA PDU) session in a wireless communication network, the SMF entity comprising:
    a processor;
    a communicator; and
    an MA PDU session managing controller, coupled with the processor and the communicator, configured to:
        receive, from a user equipment (UE), a message indicating that a protocol data unit (PDU) session is the MA PDU session,
        transmit, to a network slice admission control function (NSACF) entity, a PDU session update request message including information on multiple access types and a request to increase or decrease a number of PDU sessions per single-network slice selection assistance information (S-NSSAI), wherein the information on multiple access types includes a first access type and an additional access type, and receive, from the NSACF entity, a result indication for each of the multiple access types.

11. The SMF entity of claim 10,
wherein increasing or decreasing the number of PDU sessions per the S-NSSAI is performed during an MA PDU session establishment procedure or a PDU session release procedure.

12. The SMF entity of claim 10,
wherein the first access type indicates one of a 3rd generation partnership project (3GPP) access type or a non-3GPP access type and the additional access type indicates the other of the 3GPP access type or the non-3GPP access type.

13. The SMF entity of claim 10,
wherein the result indication includes information on whether a maximum number of PDU sessions per S-NSSAI is reached or not.

14. A network slice admission control function (NSACF) entity for managing a multiple access protocol data unit (MA PDU) session in a wireless communication network, the NSACF entity comprising:
a processor;
a communicator; and
an MA PDU session managing controller, coupled with the processor and the communicator, configured to:
receive, from a session management function (SMF) entity, a protocol data unit (PDU) session update request message including information on multiple access types and a request to increase or decrease a number of PDU sessions per single-network slice selection assistance information (S-NSSAI), wherein the information on multiple access types includes a first access type and an additional access type, update the number of PDU sessions per the S-NSSAI based on the information on multiple access types and the request, transmit, to the SMF entity, a result indication for each of the multiple access types.

15. The NSACF entity of claim 14,
wherein updating the number of PDU sessions comprises one of increasing the number of the PDU sessions or decreasing the number of the PDU sessions per the S-NSSAI based on the information on multiple access types and the request.

16. The NSACF entity of claim 14,
wherein the first access type indicates one of a 3rd generation partnership project (3GPP) access type or a non-3GPP access type and the additional access type indicates the other of the 3GPP access type or the non-3GPP access type.

17. The NSACF entity of claim 14,
wherein the MA PDU session managing controller is further configured to:
identify whether a maximum number of PDU sessions per S-NSSAI is reached.

18. The NSACF entity of claim 14,
wherein the result indication includes information on whether a maximum number of PDU sessions per S-NSSAI is reached or not.

* * * * *